United States Patent
Sun (10) Patent No.: US 11,609,699 B2
(45) Date of Patent: Mar. 21, 2023

(54) MEMORY DEVICE WITH PARITY DATA SYSTEM AND METHOD

(71) Applicant: Micron Technology, Inc., Boise, ID (US)

(72) Inventor: Yaohua Sun, Yancheng (CN)

(73) Assignee: Micron Technology, Inc., Boise, ID (US)

( * ) Notice: Subject to any disclaimer, the term of this patent is extended or adjusted under 35 U.S.C. 154(b) by 165 days.

(21) Appl. No.: 16/959,364

(22) PCT Filed: Jun. 24, 2019

(86) PCT No.: PCT/CN2019/092554
§ 371 (c)(1),
(2) Date: Jun. 30, 2020

(87) PCT Pub. No.: WO2020/257977
PCT Pub. Date: Dec. 30, 2020

(65) Prior Publication Data
US 2022/0004323 A1 Jan. 6, 2022

(51) Int. Cl.
*G06F 3/00* (2006.01)
*G06F 3/06* (2006.01)
*G06F 11/10* (2006.01)

(52) U.S. Cl.
CPC ............ *G06F 3/0619* (2013.01); *G06F 3/064* (2013.01); *G06F 3/0656* (2013.01); *G06F 3/0679* (2013.01); *G06F 11/1068* (2013.01)

(58) Field of Classification Search
None
See application file for complete search history.

(56) References Cited

U.S. PATENT DOCUMENTS

| | | | |
|---|---|---|---|
| 5,787,460 A | * | 7/1998 | Yashiro ............... G06F 11/1076 711/155 |
| 10,067,829 B2 | | 9/2018 | Frickey, III et al. |
| 2010/0107003 A1 | | 4/2010 | Kawaguchi |
| 2011/0138113 A1 | * | 6/2011 | Leach .................. G06F 3/0619 711/E12.008 |

(Continued)

FOREIGN PATENT DOCUMENTS

| | | |
|---|---|---|
| CN | 108647152 A | 10/2018 |
| CN | 114072771 | 2/2022 |
| WO | 2020257977 | 12/2020 |

OTHER PUBLICATIONS

J. Hsieh and M. Liu, "Configurable reliability framework for SSD-RAID," 2014 IEEE Non-Volatile Memory Systems and Applications Symposium (NVMSA), 2014, pp. 1-6, doi: 10.1109/NVMSA.2014.6927188. (Year: 2014).*

(Continued)

*Primary Examiner* — Daniel F. McMahon
(74) *Attorney, Agent, or Firm* — Schwegman Lundberg & Woessner, P.A.

(57) ABSTRACT

Apparatus and methods are disclosed, including a memory device with circuitry to generate an amount of parity data, and to store at least a portion of the parity data within a dummy data location. Selected examples include storing meta data with the parity data to further facilitate data recovery. Selected examples include a memory device with circuitry to generate one or more parity data index entries that map protected data to parity data.

21 Claims, 4 Drawing Sheets

(56) References Cited

U.S. PATENT DOCUMENTS

| | | | |
|---|---|---|---|
| 2017/0170845 A1* | 6/2017 | Cho | H03M 13/3761 |
| 2017/0249209 A1* | 8/2017 | Yang | G06F 3/0679 |
| 2019/0034290 A1* | 1/2019 | Guo | G06F 11/106 |
| 2020/0151059 A1* | 5/2020 | Boals | G06F 3/064 |
| 2020/0210280 A1* | 7/2020 | Singidi | G06F 11/1048 |
| 2020/0233739 A1* | 7/2020 | Oh | G06F 11/1048 |
| 2020/0301780 A1* | 9/2020 | Kim | G06F 11/1072 |
| 2022/0004323 A1* | 1/2022 | Sun | G06F 3/064 |

OTHER PUBLICATIONS

R. Zheng and M. C. Huang, "Redundant memory array architecture for efficient selective protection," 2017 ACM/IEEE 44th Annual International Symposium on Computer Architecture (ISCA), 2017, pp. 214-227, doi: 10.1145/3079856.3080213. (Year: 2017).*

"International Application Serial No. PCT/CN2019/092554, International Search Report dated Mar. 24, 2020", 4 pgs.

"International Application Serial No. PCT/CN2019/092554, Written Opinion dated Mar. 24, 2020", 4 pgs.

"International Application Serial No. PCT CN2019 092554, International Preliminary Report on Patentability dated Jan. 6, 2022", 5 pgs.

* cited by examiner

MEMORY DEVICE WITH PARITY DATA SYSTEM AND METHOD

PRIORITY APPLICATION

This application is a U.S. National Stage Application under 35 U.S.C. 371 from International Application No. PCT/CN2019/092554, filed 24 Jun. 2019, which is incorporated herein by reference in its entirety.

BACKGROUND

Memory devices are semiconductor circuits that provide electronic storage of data for a host system (e.g., a computer or other electronic device). Memory devices may be volatile or non-volatile. Volatile memory requires power to maintain data, and includes devices such as random-access memory (RAM), static random-access memory (SRAM), dynamic random-access memory (DRAM), or synchronous dynamic random-access memory (SDRAM), among others. Non-volatile memory can retain stored data when not powered, and includes devices such as flash memory, read-only memory (ROM), electrically erasable programmable ROM (EEPROM), erasable programmable ROM (EPROM), resistance variable memory, such as phase change random access memory (PCRAM), resistive random-access memory (RRAM), or magnetoresistive random access memory (MRAM), among others.

Host systems typically include a host processor, a first amount of main memory (e.g., often volatile memory, such as DRAM) to support the host processor, and one or more storage systems (e.g., often non-volatile memory, such as flash memory) that provide additional storage to retain data in addition to or separate from the main memory.

A storage system, such as a solid-state drive (SSD), can include a memory controller and one or more memory devices, including a number of dies or logical units (LUNs). In certain examples, each die can include a number of memory arrays and peripheral circuitry thereon, such as die logic or a die processor. The memory controller can include interface circuitry configured to communicate with a host device (e.g., the host processor or interface circuitry) through a communication interface (e.g., a bidirectional parallel or serial communication interface). The memory controller can receive commands or operations from the host system in association with memory operations or instructions, such as read or write operations to transfer data (e.g., user data and associated integrity data, such as error data or address data, etc.) between the memory devices and the host device, erase operations to erase data from the memory devices, perform drive management operations (e.g., data migration, garbage collection, block retirement), etc.

With ever increasing data density in memory devices, bit error rates may increase, and data integrity becomes more difficult to maintain. Circuits and methods for data integrity and recovery of data are becoming increasingly important.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
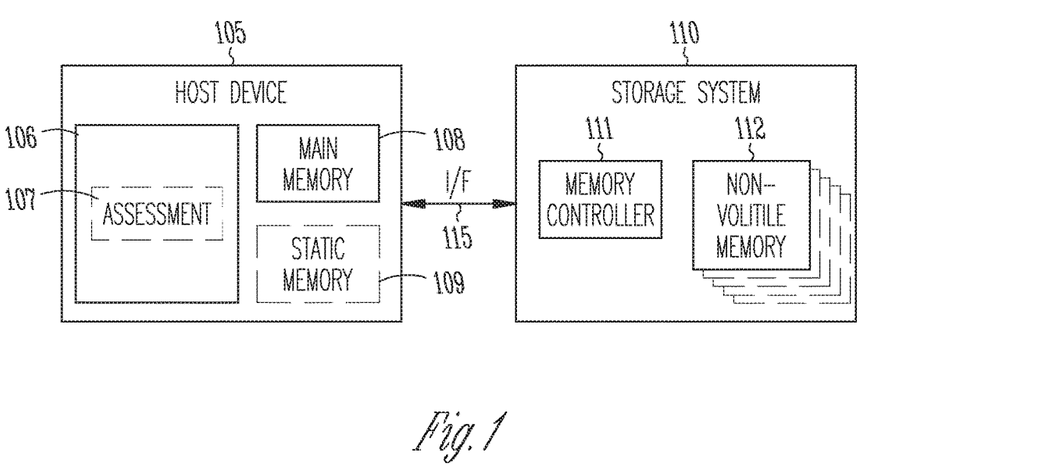
FIG. 1 illustrates an example host system including a host device and a storage system.

FIG. 1 illustrates an example system (e.g., a host system) 100 including a host device 105 and a storage system 110 configured to communicate over a communication interface (I/F) 115 (e.g., a bidirectional parallel or serial communication interface). The host device 105 can include a host processor 106 (e.g., a host central processing unit (CPU) or other processor or processing device) or other host circuitry (e.g., a memory management unit (MMU), interface circuitry, assessment circuitry 107, etc.). In certain examples, the host device 105 can include a main memory 108 (e.g., DRAM, etc.) and optionally, a static memory 109, to support operation of the host processor 106.

The storage system 110 can include a universal flash storage (UFS) device, an embedded MMC (eMMC™) device, or one or more other memory devices. For example, if the storage system 110 includes a UFS device, the communication interface 115 can include a serial bidirectional interface, such as defined in one or more Joint Electron Device Engineering Council (JEDEC) standards (e.g., JEDEC standard D223D (JESD223D), commonly referred to as JEDEC UFS Host Controller Interface (UFSHCI) 3.0, etc.). In another example, if the storage system 110 includes an eMMC device, the communication interface 115 can include a number of parallel bidirectional data lines (e.g., DAT[7:0]) and one or more command lines, such as defined in one or more JEDEC standards (e.g., JEDEC standard D84-B51 (JESD84-A51), commonly referred to as JEDEC eMMC standard 5.1, etc.). In other examples, the storage system 110 can include one or more other memory devices, or the communication interface 115 can include one or more other interfaces, depending on the host device 105 and the storage system 110.

The storage system 110 can include a memory controller 111 and a non-volatile memory 112. In an example, the non-volatile memory can include a number of memory devices (e.g., dies or LUNs), such as one or more flash memory devices, etc., each including periphery circuitry thereon, and controlled by the memory controller 111.

Flash memory devices typically include one or more groups of one-transistor, floating gate memory cells. Two common types of flash memory array architectures include NAND and NOR architectures. The floating gate memory cells of the memory array are typically arranged in a matrix. The gates of each memory cell in a row of the array are coupled to an access line (e.g., a word line). In NOR architecture, the drains of each memory cell in a column of the array are coupled to a data line (e.g., a bit line). In NAND architecture, the drains of each memory cell in a column of the array are coupled together in series, source to drain, between a source line and a bit line.

Each memory cell in a NOR, NAND, 3D Cross Point, Holographic RAM (HRAM), MRAM, or one or more other architecture semiconductor memory array can be programmed individually or collectively to one or a number of programmed states. A single-level cell (SLC) can represent one bit of data per cell in one of two programmed states (e.g., 1 or 0). A multi-level cell (MLC) can represent two or more bits of data per cell in a number of programmed states (e.g., 2, where n is the number of bits of data). In certain examples, MLC can refer to a memory cell that can store two bits of data in one of 4 programmed states. A triple-level cell (TLC) can represent three bits of data per cell in one of 8 programmed states. A quad-level cell (QLC) can represent four bits of data per cell in one of 16 programmed states. Unless otherwise clearly indicated by express language or context, MLC is used herein in its broader context, to refer to memory cells that can store more than one bit of data per cell (i.e., that can represent more than two programmed states)."

The storage system 110 can include a multimedia card (MMC) solid-state storage device (e.g., micro secure digital (SD) cards, etc.). MMC devices include a number of parallel interfaces (e.g., an 8-bit parallel interface) with a host device 105, and are often removable and separate components from the host device. In contrast, embedded MMC (eMMC) devices are attached to a circuit board and considered a component of the host device, with read speeds that rival serial ATA (SATA) based SSD devices. As demand for mobile device performance continues to increase, such as to fully enable virtual or augmented-reality devices, utilize increasing networks speeds, etc., storage systems have shifted from parallel to serial communication interfaces. UFS devices, including controllers and firmware, communicate with a host device using a low-voltage differential signaling (LVDS) serial interface with dedicated read/write paths, further advancing read/write speeds between a host device and a storage system.

In three-dimensional (3D) architecture semiconductor memory device technology, vertical floating gate or charge trapping storage structures can be stacked, increasing the number of tiers, physical pages, and accordingly, the density of memory cells in a memory device.

Data is often stored arbitrarily on the storage system as small units. Even if accessed as a single unit, data can be received in small, random 4-16 k single file reads (e.g., 60%-80% of operations are smaller than 16 k). It is difficult for a user and even kernel applications to indicate that data should be stored as one sequential cohesive unit. File systems are typically designed to optimize space usage, and not sequential retrieval space.

The memory controller 111 can receive instructions from the host device 105, and can communicate with the non-volatile memory 112, such as to transfer data to (e.g., write or erase) or from (e.g., read) one or more of the memory cells of the non-volatile memory array 112. The memory controller 111 can include, among other things, circuitry or firmware, such as a number of components or integrated circuits. For example, the memory controller 111 can include one or more memory control units, circuits, or components configured to control access across the memory array and to provide a translation layer between the host device 105 and the storage system 100.

The non-volatile memory array 112 (e.g., a 3D NAND architecture semiconductor memory array) can include a number of memory cells arranged in, for example, a number of devices, planes, blocks, or physical pages. As one example, a TLC memory device can include 18,592 bytes (B) of data per page, 1536 pages per block, 548 blocks per plane, and 4 planes per device. As another example, an MLC memory device can include 18,592 bytes (B) of data per page, 1024 pages per block, 548 blocks per plane, and 4 planes per device, but with half the required write time and twice the program/erase (P/E) cycles as a corresponding TLC memory device. Other examples can include other numbers or arrangements.

In operation, data is typically written to or read from the storage system 110 in pages and erased in blocks. However, one or more memory operations (e.g., read, write, erase, etc.) can be performed on larger or smaller groups of memory cells, as desired. For example, a partial update of tagged data from an offload unit can be collected during data migration or garbage collection to ensure it was re-written efficiently. The data transfer size of a memory device is typically referred to as a page, whereas the data transfer size of a host device is typically referred to as a sector. Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512B) as well as a number of bytes (e.g., 32B, 54B, 224B, etc.) of metadata corresponding to the user data, such as integrity data (e.g., error detecting or correcting code data), address data (e.g., logical address data, etc.), or other metadata associated with the user data.

Different types of memory cells or memory arrays can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, an MLC NAND flash device may have a higher bit error rate than a corresponding SLC NAND flash device. As such, the MLC device may require more metadata bytes for error data than the corresponding SLC device.

Figure 2:
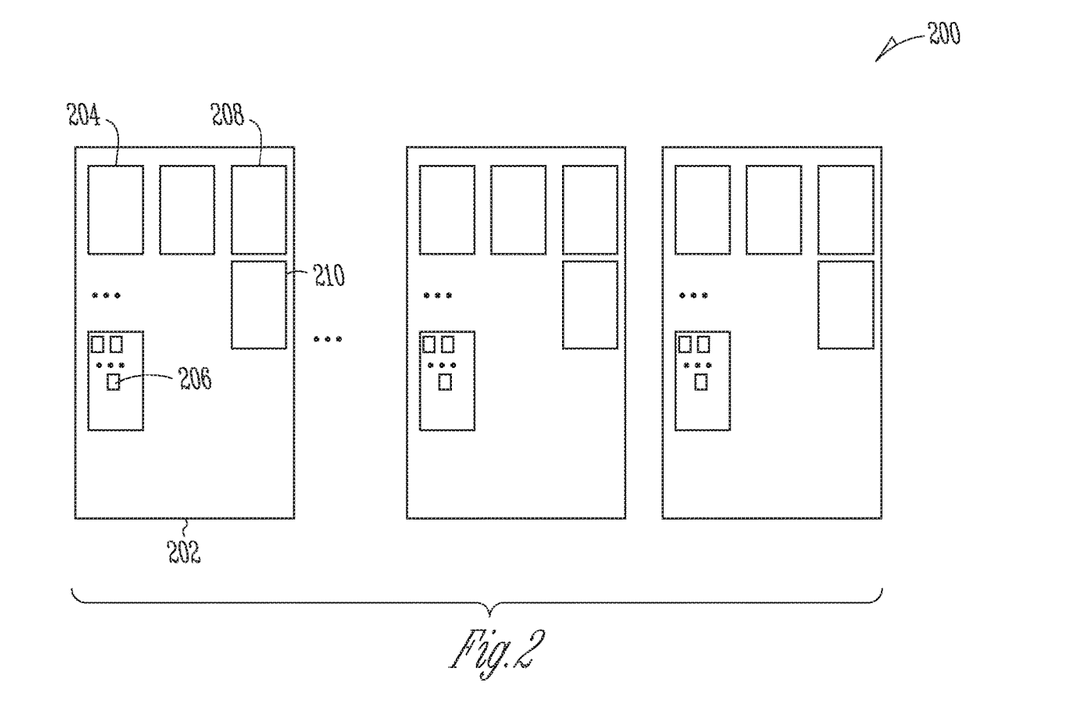
FIG. 2 illustrates an example memory device in accordance with some example embodiments.

FIG. 2 shows a block diagram of memory storage in a memory device 200 similar to the memory storage organization discussed above. FIG. 2 shows a number of dies 202 that are grouped together in a single memory device 200. One example of a grouping of dies is shown in FIG. 1, where a stack of dies in the non-volatile memory 112 is shown, although the invention is not so limited. Other examples may include dies mounted side by side on a substrate, or on opposite sides of a substrate.

One or more dies 202 in the memory device 200 may include multiple blocks 204. FIG. 2 further illustrates each block 204 including multiple pages 206. In the example of FIG. 2, it is noted that the number of pages 206 in a block 204, the number of blocks 204 in a die 202, and the number of dies 202 in the memory device 200 are for illustration only. The actual number of components and/or subdivisions varies.

In one example, selected blocks are designated for dedicated purposes. For example, while a majority of blocks 204 may be designated for data storage, in one example a dummy data index block 208 may be designated. In one example a parity data index block 210 may be designated. Specific characteristics of dummy data index blocks 208 and parity data index blocks 210 are discussed in more detail below. Other examples may not include dedicated blocks. Although a single block is used for illustration to describe dummy data index blocks 208 and parity data index blocks, 210, the invention is not so limited. Multiple blocks may be used for each type of index block in selected examples.

Figure 3:
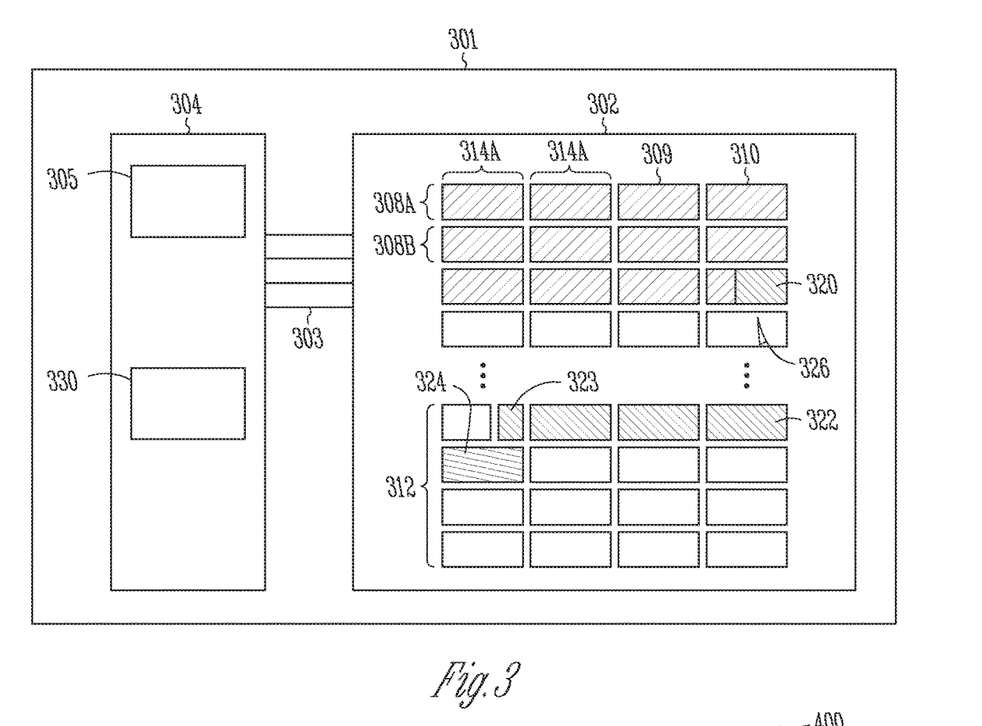
FIG. 3 illustrates an example page of a memory device in accordance with some example embodiments.

FIG. 3 shows a block diagram of a memory device 300 that includes dies, blocks and pages, similar to FIG. 2. In one example, memory device 300 may be used in a context of storage system 110 from FIG. 1. The memory device 300 includes a non-volatile memory 302, such as a stack of flash memory dies. The memory device 300 includes a controller 304, that includes a number of circuits to control the non-volatile memory 302. FIG. 3 shows both the non-volatile memory 302 and the controller 304 coupled to a substrate 301, such as a circuit board. The controller 304 is coupled to the non-volatile memory 302 through one or more communication lines 303.

Similar to examples described in FIG. 2, the non-volatile memory 302 illustrates a number of dies 314a, 314b, etc. Within the dies 314, multiple blocks 308a, 308b, etc. are included. Within one or more of the blocks 308, multiple pages 309 are included. Four pages 309 to a block 308 are shown in FIG. 3 for illustration only.

The pages shaded as 310 indicate an amount of user data 310. The portions shaded as 320 indicate an amount of dummy data 320. In operation, an amount of user data 310 is frequently of an amount that does not fit exactly into a single page 309. In such as case, the remaining space may be filled with dummy data in order to ensure that only full pages are written. In the example of FIG. 3, the dummy data 320 includes parity data.

In one example circuitry 305 in the controller 304 is configured to write the amount of dummy data 320 along with user data 310 to make at least one full page 326 as shown in FIG. 3. In one example, the circuitry 305 in the controller 304 is configured to write parity data along with, or in place of dummy data 320. In one example the parity data includes XOR parity data, although any type of parity data is within the scope of the invention.

In the example of FIG. 3, a number of parity blocks 312 are included in the non-volatile memory 302. In one example, parity data is written to one or more blocks in the parity blocks 312, then later relocated to dummy data locations, as discussed in more detail below.

In operation, user data 310 is written to pages 309 and blocks 308 within the non-volatile memory 302. Either continuously, or at selected intervals, for example once a block 308 is filled, parity data for the block 308 is generated using circuitry 305. The circuitry then writes the parity data into a parity data block 322. In selected examples, as shown in page 326, the user data 310 only occupies a portion of the next available page. In one example, a portion of parity block 322 is transferred from its current location in the parity blocks 312, and is written into the dummy data 320. A remaining portion 323 of the parity block 322 may be written into a different parity block as shown. In one example, a dummy data index entry may be saved into a DRAM buffer, when the buffer fills up a page worth of data, it will write the page into dummy data index block 324. In one example, for added reliability, the dummy data index block is written into a more stable memory hardware region, for example a single level cell (SLC) NAND block. One example of a dummy data index block is shown as block 208 of FIG. 2. In one example, the next time dummy data is needed to fill a partial page of user data 310, the dummy data index entry 324 is searched.

In one example, shown in FIG. 3, a buffer 330 is included. In the example shown, the buffer 330 is located within the controller 304. In other examples, the buffer 330 is located elsewhere within the memory device 300, and is coupled in communication with the controller 304 and the non-volatile memory 302. In one example, parity data is generated using circuitry 305, then stored in the buffer 330 temporarily. The parity data may be moved from the buffer 330 to one or more parity blocks 312. In one example, the buffer 330 may be utilized to transfer all or a portion of a parity block 312 to dummy data 320 as described above.

In one example, circuitry 305 is further configured to erase dummy data that includes parity data as needed to free up space for user data. In one example, the circuitry 305 is configured to re-build the parity data at a later time when memory space is available. For example, if a data index block exists, there is a record of what data was previously protected by parity data. Because the underlying data is still stored, the parity data can be reconstructed, provided the underlying data has not been compromised in the meantime. In one example the circuitry 305 may move the parity data from one dummy data space 320 to another dummy data space 320. In one example, the circuitry 305 may move the parity data from a dummy data space 320 to a parity block 312.

Figure 4A:
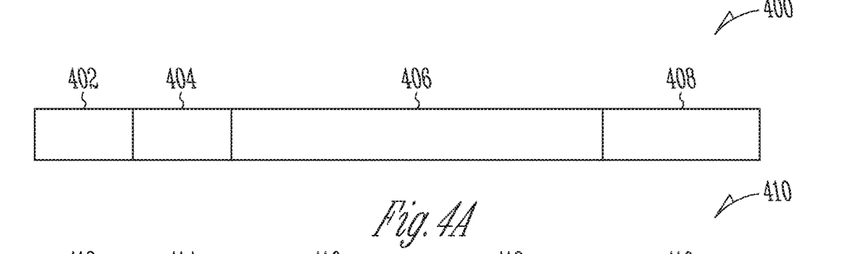
FIG. 4A illustrates a block diagram of a parity data block in accordance with some example embodiments.

FIG. 4A shows an example parity data entry 400. In one example, the parity data entry 400 includes one or more meta data fields, such as headers or footers that contain additional meta data. In the example of FIG. 4A, the parity data is stored in portion 406. In one example a location of the data being protected by the parity data 406 is further stored within the entry 400. In the example, of FIG. 4A, the entry 400 includes a protected data start location 402 and a length of the protected data 404.

Figures 4B, 4C:
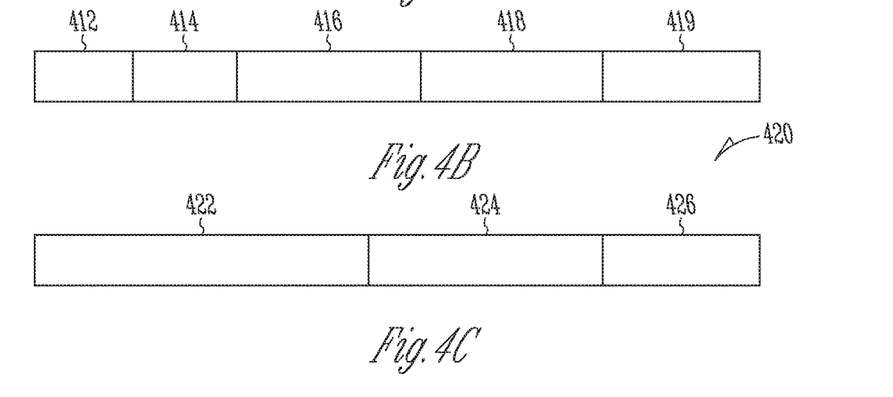
FIG. 4B illustrates a block diagram of an index block in accordance with some example embodiments.
FIG. 4C illustrates a block diagram of another index block in accordance with some example embodiments.

FIG. 4B shows an example parity index entry 410 format. In the example of FIG. 4B, a protected user data start location 412 is included, and a protected user data length 414. A parity data start location 416 is included, as well as a parity data length 418. In this example, the parity index entry 410 can be used to find the parity data, and to find the corresponding user data protected by the parity data. The user data can then be reconstructed using the parity data if an error occurs. In one example, the parity index entry 410 further includes a time stamp 419. In selected examples, parity index entries 410 may be saved into a ring buffer. In one example, the ring buffer is single level cell NAND, although the invention is not so limited. Using the time stamp 419, older parity index entries 410 may be discarded as newer parity index entries 410 are created. Because, as described above, parity data may be moved a number of times, the most recent parity index entries 410 are the most current, and older entries may be discarded to create more available memory space.

In one example, one or more parity data index entries can index parity data locations within parity data blocks, such as parity blocks 312. In one example, one or more parity data index entries can index parity data locations within dummy data, for example dummy data entry 320. In one example an index entry for locations within parity data blocks is different from an index entry for locations within dummy data. Dummy data entries may start within a middle of a page, as illustrated in FIG. 3. One way to index such an entry is illustrated in FIG. 4B as described above.

FIG. 4C shows a parity block index entry 420 for locations within parity data blocks, such as parity blocks 312. The parity block index entry 420 includes a protected user data block address 422, and a parity data block address 424. In one example, the parity block index entry 420 includes a time stamp 426. Similar to the parity index entry 410, the parity block index entry 420 may be saved into a ring buffer. In one example, for added reliability, ring buffers include a more stable memory hardware region, capable of larger numbers of reliable read and write cycles, for example a single level cell (SLC) NAND block. Using the time stamp 426, older parity block index entries 420 may be discarded as newer parity block index entries 420 are created.

In one example, multiple partial pages of parity data may be stored in dummy data spaces as described above. In such an example, the circuitry 305 may stitch together the number of partial pages of parity to form a complete parity data page before recovery of the protected data. Although dummy data is illustrated in the above examples as completing partial entries at the page level, the invention is not so limited. In one example, dummy data is used to complete partial data at a block level. For example, entire pages of dummy data may be written to fill up a wordline or multiple wordlines within the same NAND block, for the purpose of data integrity and/or preparation in case of a power shutdown. Other levels, such as a die level are also within the scope of the invention.

Figure 5:
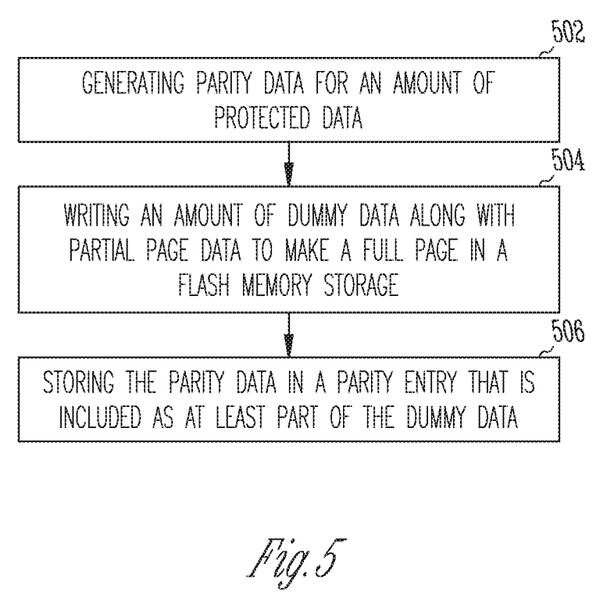
FIG. 5 illustrates an example method flow diagram in accordance with some example embodiments.

FIG. 5 shows a block diagram of a method of operating a memory device as described in the present disclosure. In operation 502, parity data is generated for an amount of protected data. In operation 504, an amount of dummy data is written along with partial page data to make a full page in a flash memory storage. In operation 506, the parity data is stored in a parity entry that is included as at least part of the dummy data. Other example methods include the writing of one or more index entries or index blocks to map protected data with parity data.

In one example, when other read data recovery methods (such as error correction code, etc.) fail to recover a page of data, a check is preformed to see whether the unreadable page has parity data protection by checking parity index blocks. If the parity data is not found in the parity index blocks, we will check the dummy data index blocks to see whether there is an index entry of parity data located in dummy data. If there are not corresponding entries in the dummy data index block, a further method may search all dummy data headers for protected data locations that may be stored within parity entries according to examples described above.

Figure 6:
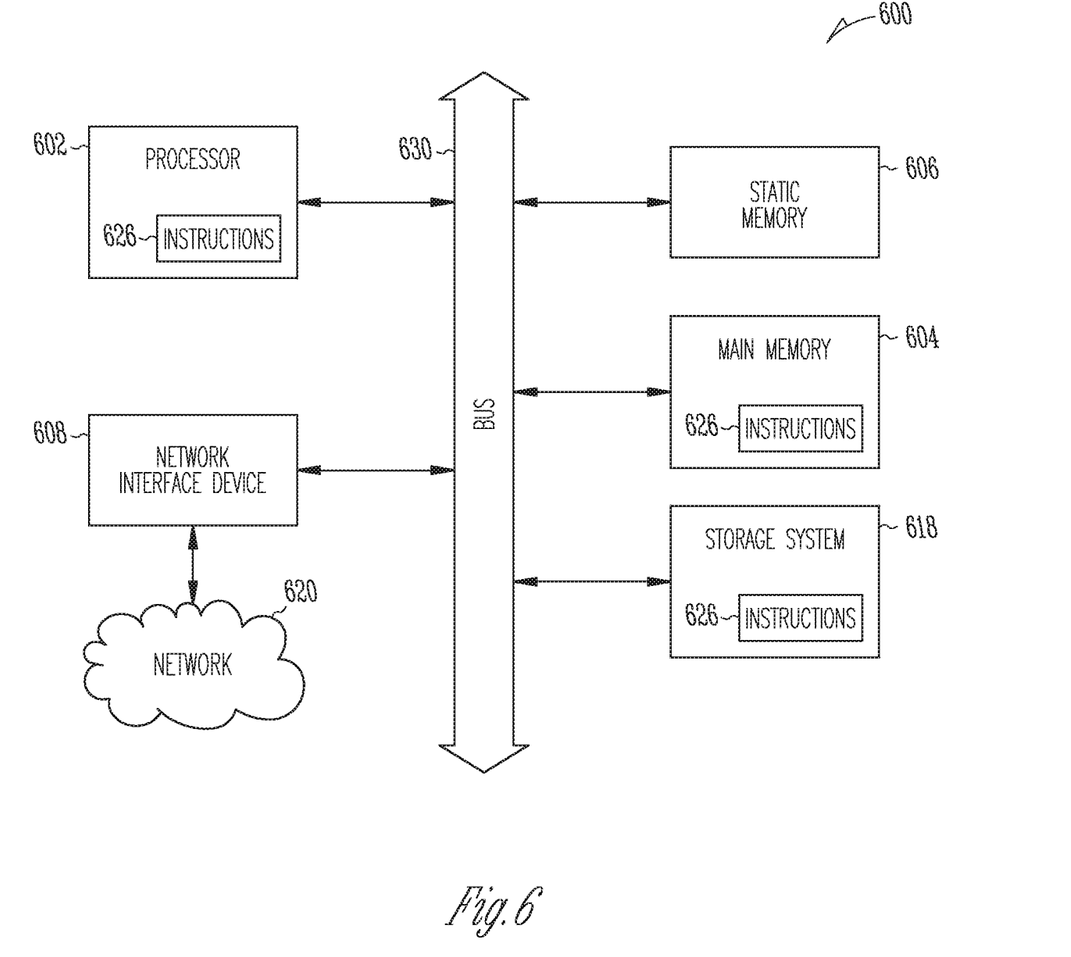
FIG. 6 illustrates an example block diagram of an information handling system in accordance with some example embodiments.

FIG. 6 illustrates a block diagram of an example machine (e.g., a host system) 600 that may include memory devices and circuitry configured to generate and utilize parity data as described in examples above. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system, a host system, etc.) 600 may include a processing device 602 (e.g., a hardware processor, a central processing unit (CPU), a graphics processing unit (GPU), a hardware processor core, or any combination thereof, etc.), a main memory 604 (e.g., read-only memory (ROM), dynamic random-access memory (DRAM) such as synchronous DRAM (SDRAM) or Rambus DRAM (RDRAM), etc.), a static memory 606 (e.g., static random-access memory (SRAM), etc.), and a storage system 618, some or all of which may communicate with each other via a communication interface (e.g., a bus) 630.

The processing device 602 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 can be configured to execute instructions 626 for performing the operations and steps discussed herein. The computer system 600 can further include a network interface device 608 to communicate over a network 620.

The storage system 618 can include a machine-readable storage medium (also known as a computer-readable medium) on which is stored one or more sets of instructions 626 or software embodying any one or more of the methodologies or functions described herein. The instructions 626 can also reside, completely or at least partially, within the main memory 604 or within the processing device 602 during execution thereof by the computer system 600, the main memory 604 and the processing device 602 also constituting machine-readable storage media.

The term "machine-readable storage medium" should be taken to include a single medium or multiple media that store the one or more sets of instructions, or any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 600 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 600 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 626 (e.g., software, programs, an operating system (OS), etc.) or other data are stored on the storage system 618 can be accessed by the main memory 604 for use by the processing device 602. The main memory 604 (e.g., DRAM) is typically fast, but volatile, and thus a different type of storage than the storage system 618 (e.g., an SSD), which is suitable for long-term storage, including while in an "off" condition. The instructions 626 or data in use by a user or the machine 600 are typically loaded in the main memory 604 for use by the processing device 602. When the main memory 604 is full, virtual space from the storage system 618 can be allocated to supplement the main memory 604; however, because the storage system 618 device is typically slower than the main memory 604, and write speeds are typically at least twice as slow as read speeds, use of virtual memory can greatly reduce user experience due to storage system latency (in contrast to the main memory 604, e.g., DRAM). Further, use of the storage system 618 for virtual memory can greatly reduce the usable lifespan of the storage system 618.

The instructions 624 may further be transmitted or received over a network 620 using a transmission medium via the network interface device 608 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 608 may include one or more physical jacks (e.g., Ethernet, coaxial, or phone jacks) or one or more antennas to connect to the network 620. In an example, the network interface device 608 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a select gate source (SGS), a control gate (CG), and a select gate drain (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (i.e., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

To better illustrate the method and apparatuses disclosed herein, a non-limiting list of embodiments is provided here:

Example 1 is a memory device. The memory device includes at least one flash memory storage. The memory device also includes circuitry in the memory device to write an amount of dummy data in the flash memory storage. The memory device also includes circuitry in the memory device to generate parity data for an amount of protected data. The memory device also includes circuitry in the memory device to store the parity data in a parity entry that is included as at least part of the dummy data.

In Example 2, the subject matter of Example 1 is optionally configured such that the circuitry in the memory device to write an amount of dummy data includes circuitry to write the dummy data along with partial page data to make a full page in the flash memory storage.

In Example 3, the subject matter of any of Examples 1-2 is optionally configured such that circuitry in the memory device is configured to write a full page of dummy data that includes parity data.

In Example 4, the subject matter of Examples 1-3 is optionally configured such that the parity entry includes a protected data location header.

In Example 5, the subject matter of any of Examples 1-4 is optionally configured to further include a buffer, and wherein the circuitry in the memory device to generate parity data is configured to store an amount of parity data in the buffer at a first time, and wherein the circuitry in the memory device to store the parity data is configured to write the amount of parity data from the buffer to at least part of the dummy data at a second time different from the first time.

In Example 6, the subject matter of any of Examples 1-5 is optionally configured to further include circuitry configured to write a parity data index block cataloging a location of one or more parity entries.

In Example 7, the subject matter of any of Examples 1-6 is optionally configured to further include circuitry configured to stitch together multiple parity entries from different locations to recover protected data.

In Example 8, the subject matter of any of Examples 1-7 is optionally configured to further include circuitry configured to erase one or more parity entries from the dummy data space to free up memory space, and to recreate the one or more parity entries when memory space is later available.

In Example 9, the subject matter of any of Examples 1-8 is optionally configured such that the parity entry further includes a time stamp.

In Example 10, the subject matter of any of Examples 1-9 is optionally configured to further include circuitry in the memory device to write an amount of dummy data along with partial block data to make a full block in the flash memory storage.

Example 11 is a memory device. The memory device includes at least one flash memory storage. The memory device also includes circuitry in the memory device to write an amount of dummy data in the flash memory storage. The memory device also includes circuitry in the memory device to generate parity data for an amount of protected data. The memory device also includes circuitry in the memory device to store the parity data in a parity entry that is included as at least part of the dummy data, wherein the parity entry includes a protected data location, and the parity data for the protected data in the protected data location. The memory device also includes circuitry in the memory device to generate a parity data index block, wherein the parity data index block includes the protected data location, and the parity entry location for the protected data in the protected data location.

In Example 12, the subject matter of Example 11 is optionally configured such that the parity entry further includes a time stamp.

In Example 13, the subject matter of any of Examples 9-12 is optionally configured such that the parity data index block further includes a time stamp.

In Example 14, the subject matter of any of Examples 9-13 is optionally configured such that the parity entry location includes data start location and length.

In Example 15, the subject matter of any of Examples 9-14 is optionally configured such that the parity entry location includes a parity block address.

Example 16 is a method, including generating parity data for an amount of protected data, writing an amount of dummy data along with partial page data to make a full page in a flash memory storage, and storing the parity data in a parity entry that is included as at least part of the dummy data.

In Example 17, the subject matter of Example 16 is optionally configured such that storing the parity data in a parity entry includes storing a protected data location and parity data in the parity entry.

In Example 18, the subject matter of any of Examples 14-17 is optionally configured such that storing the parity data in a parity entry further includes storing a time stamp in the parity entry.

In Example 19, the subject matter of any of Examples 14-18 is optionally configured to further include generating a parity data index block that includes a protected data location and a parity entry location.

In Example 20, the subject matter of any of Examples 14-19 is optionally configured to further include recovering from a read data error by searching the parity data index block.

In Example 21, the subject matter of any of Examples 14-20 is optionally configured to further include recovering from a read data error by searching dummy data headers for parity entries.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A memory device, comprising:
   at least one flash memory storage;

circuitry in the memory device to write an amount of dummy data in the flash memory storage;

circuitry in the memory device to generate parity data for an amount of protected data;

circuitry in the memory device to store the parity data in a parity entry that is included as at least part of the dummy data, wherein the parity data replaces at least part of the dummy data.

2. The memory device of claim 1, wherein the circuitry in the memory device to write an amount of dummy data includes circuitry to write the dummy data along with partial page data to make a full page in the flash memory storage.

3. The memory device of claim 1, further including circuitry in the memory device to write a full page of dummy data that includes parity data.

4. The memory device of claim 1, wherein the parity entry includes a protected data location header.

5. The memory device of claim 1, further including a buffer, and wherein the circuitry in the memory device to generate parity data is configured to store an amount of parity data in the buffer at a first time, and wherein the circuitry in the memory device to store the parity data is configured to write the amount of parity data from the buffer to at least part of the dummy data at a second time different from the first time.

6. The memory device of claim 1, further including circuitry configured to write a parity data index block cataloging a location of one or more parity entries.

7. The memory device of claim 1, further including circuitry configured to stitch together multiple parity entries from different locations to recover protected data.

8. The memory device of claim 1, further including circuitry configured to erase one or more parity entries from the dummy data to free up a first memory space, and to recreate the one or more parity entries when a second memory space is later available.

9. The memory device of claim 1, wherein the parity entry further includes a time stamp.

10. The memory device of claim 1, further including circuitry in the memory device to write an amount of dummy data along with partial block data to make a full block in the flash memory storage.

11. A memory device, comprising:
at least one flash memory storage;
circuitry in the memory device to write an amount of dummy data in the flash memory storage;
circuitry in the memory device to generate parity data for an amount of protected data;
circuitry in the memory device to store the parity data in a parity entry that is included as at least part of the dummy data, wherein the parity data replaces at least part of the dummy data, wherein the parity entry includes;
a protected data location; and
the parity data for the protected data in the protected data location;
circuitry in the memory device to generate a parity data index block,
wherein the parity data index block includes:
the protected data location; and
the parity entry location for the protected data in the protected data location.

12. The memory device of claim 11, wherein the parity entry further includes a time stamp.

13. The memory device of claim 11, wherein the parity data index block further includes a time stamp.

14. The memory device of claim 11, wherein the parity entry location includes data start location and length.

15. The memory device of claim 11, wherein the parity entry location includes a parity block address.

16. A method, comprising:
generating parity data for an amount of protected data;
writing an amount of dummy data along with partial page data to make a full page in a flash memory storage; and
storing the parity data in a parity entry that is included as at least part of the dummy data, wherein the parity data replaces at least part of the dummy data.

17. The method of claim 16, wherein storing the parity data in a parity entry includes storing a protected data location and parity data in the parity entry.

18. The method of claim 17, wherein storing the parity data in a parity entry further includes storing a time stamp in the parity entry.

19. The method of claim 16, further including generating a parity data index block that includes a protected data location and a parity entry location.

20. The method of claim 16, further including recovering from a read data error by searching the parity data index block.

21. The method of claim 16, further including recovering from a read data error by searching dummy data headers for parity entries.

* * * * *